Patented Nov. 18, 1941

2,263,224

UNITED STATES PATENT OFFICE 2,263,224

RESIN PRODUCED FROM STILL RESIDUES

Joseph Rivkin and Lyle M. Geiger, Pittsburgh, Pa., assignors to The Neville Company, Pittsburgh, Pa., a corporation of Pennsylvania No Drawing. Application September 21, 1938, Serial No. 230,987

3 Claims. (Cl. 260—81)

This invention relates to the improvement of resins derivable from still residues obtained in the recovery of aromatic light oils produced in the high temperature carbonization of coal in by-product coke ovens.

The aromatic light oils present in coke oven gases are usually scrubbed out with a wash oil to produce a solution of the light oils which is then distilled to obtain a mixture of light oils that is fractionated to obtain impure cuts of the individual oils. These cuts are then subjected to distillation in the so-called "pure stills" to obtain purified benzol, motor benzol, toluol, and xylol. Before actual distillation, however, the impure cuts are treated with sulfuric acid to refine them, and the acid remaining in the cuts is then neutralized, commonly with lime or soda ash, or both. The residues remaining in the pure stills used in the production of purified solvents are commingled and are known in the trade as pure still residues.

These residues comprise mixtures of resins and oils in varying amounts depending, for example, on the degree to which the solvents have been stripped out in distillation, together with a substantial content of mineral matter, or ash, arising largely from the neutralization step referred to. Some portion of the ash may appear as calcium sulfate and thus be neutral and insoluble in water. A substantial part of the ash is, however, alkaline in character and more or less soluble in water. Although variable, the composition of pure still residues may be taken, on an average, as follows:

| | Per cent |
|---|---|
| Volatile oil | 65 |
| Resinous bodies | 30 |
| Ash | 5 |

Pure still residues are generally disposed of by adding them to coke oven tar, or by burning them as fuel, because as produced their market value has been insufficient to justify anything else, there being known no profitable mode of working them up into useful products.

A method of recovering the resin content of pure still residues is disclosed and claimed in a copending application of William H. Carmody, Serial No. 85,747, filed June 17, 1936, involves steam distilling the still residues heated to at least about 250° C. to strip them of high boiling oils, leaving the resin as a residue. This resin may have a melting point as high as 150° C., depending upon the thoroughness with which the oils are removed. In such production of the resin the ash content remains in it and, due to removal of the oils, the concentration of ash becomes higher, reaching as much as 18 to 20 per cent by weight of the resin.

The resin thus recovered has some properties which adapt it for various uses, as in the varnish and lacquer industries, in the manufacture of printing inks, in caulking compounds, resinous binders, and other specialized applications. For some purposes the ash may act as a filler and be not objectionable. For other uses, such as in the varnish and lacquer industries, the ash content is highly objectionable because it causes the resin to have a dull appearance and a granular fracture, which thus injures its appearance and limits its use because for these purposes brilliant color and conchoidal fracture are desired. The ash is objectionable for some purposes also because it is, at least to some extent, soluble in water and exhibits an alkaline reaction. The ash is especially objectionable in the production of such materials as lacquers, varnishes and other coating compositions because solutions of the resin, for instance in aromatic solvents, show partial settling of the insoluble matter, while films of the resin made from such solutions exhibit a non-uniform and grainy surface. Similarly, solutions of the resin in drying and semi-drying oils exhibit considerable insoluble matter originating in the ash content of the resin. These characteristics prohibit the use of this resin for many commercial applications.

Another objectionable characteristic of the resin produced as described above is that it melts with considerable foaming, and when melted the solution is of high viscosity due to the increase in internal resistance to flow caused by the finely divided ash.

It is among the objects of this invention to provide resin of the type described having improved characteristics and in which the disadvantages due to the ash content of the resin are reduced or eliminated. More particularly, the invention aims to provide resin of the class described which possesses a glossy appearance and a conchoidal fracture, forms melts of low viscosity, solutions of which produce dried films which are smooth and clear, and in which the ash has been converted to a form compatible with the resin and products made therefrom so that it does not exhibit the undesirable properties of untreated resin.

The invention is predicated upon our discovery that its stated objects are attained by neutralizing the alkaline content of the ash with an organic acidic material, more particularly those of resinous or plastic characteristics. We have discovered, in other words, that by treating resin derived or producible from pure still residues with an organic acidic material the ash content is converted to a form, presumably a soap, which is fully compatible with the resinous matrix in which it remains, and is non-alkaline and insoluble in water, while the resultant resin exhibits true resin characteristics as to appearance and fracture and may be worked up into coating compositions and other products in which absence of deposit and production of clean, bright films is an essential property.

In the practice of the invention any organic acidic material capable of neutralizing the alkaline ash content of the resin may be used, but for economic reasons the cheap materials are most desirable, especially since the brown color of the resin warrants only a relatively low market price. Examples of these are colophony, the copals, sandarac, and the like, or any of the fatty acid pitches such as those derived from cottonseed, tallow, or lard. At present we prefer to use rosin, particularly wood rosin. Particularly, economy is afforded by the acid sludge resultant from washing of the light oils with sulfuric acid. This sludge comprises, in addition to acid, resin polymers and resin sulphonic acids capable of neutralizing the ash content of the resin contemplated, and not only is it a waste material, but also it originates at the source of the pure still residues, for which reason its use is economically desirable in the practice of the invention.

In the practice of the invention there is added to the resin, or material containing the resin, an amount of organic acidic material sufficient to react with the alkaline content of the ash. For most purposes and in most instances it is necessary to heat the mixture to effect the ash-converting reaction, and for most purposes the mixture should be heated to at least about 200° C., suitably above about 250° C. The upper temperature limit is, of course, governed by the temperature at which the resin would undergo depolymerization or decomposition. We have found that with most of the organic acidic materials referred to specifically, suitable results are obtained by heating the mixture at about 260 to 285° C.

The amount of organic acidic material will depend, of course, upon the acidity, in terms of acid number, of the material, and upon the alkalinity of the ash contained in the resin, which will vary somewhat depending upon various factors such as the alkali used in neutralizing the light oil, the source of the still residues, and the like. In the practice of the invention, however, there is used sufficient organic acidic material to neutralize that portion of the ash which is alkaline and convert it to an organic soap, such as a fatty acid soap or a resinate.

There may be used resin produced in accordance with the invention disclosed in the above-identified application of William H. Carmody. As exemplifying this, in one test a mixture of 77 parts of such resin and 23 parts of cottonseed pitch was heated until completely fused and the temperature was then raised to 260° C., the mixture being continuously stirred. Before the melt reached 260° C. considerable foaming occurred. After about one-half hour the foaming subsided and the product was poured into a pan. The resulting resin was hard and brittle, and it possessed a bright satisfactory fracture, all in contrast with untreated resin. The product different from the original resin also in that a solution of the treated resin in xylol yielded a much smoother and less seedy film than a similar solution of the original resin.

In another similar test a mixture of 80 per cent by weight of resin of 140–150° C. melting point and 20 per cent by weight of wood rosin of WW grade were heated, with stirring, at 265° to 280° C. for 12 minutes. The product was then poured into pans and allowed to cool. When cool it exhibited the characteristics of resin prepared in accordance with this invention, namely, conchoidal fracture and bright appearance, in contrast with the dull appearance and granular fracture of the untreated resin.

This treated resin was dissolved by heating in cold-processed sardine oil, and the solution yielded smoother and more satisfactory films than the untreated resin of the same grade. Solutions of the treated and untreated resin were also made in Stoddard solvent naphtha, using 50 per cent by weight of resin and 50 per cent by weight of the solvent naphtha. Panels were flowed out from each solution. That made from the treated resin provided a satisfactory and continuous film showing but a slight amount of undissolved matter. The panel prepared from the untreated resin yielded an unsatisfactory film containing undissolved matter thickly deposited by the solvent to yield an opaque and very seedy film which was of no value.

Although the resin itself may be treated in accordance with the invention, the foaming which occurs in consequence of the reaction may be objectionable, and may, in some instances, be difficult to control. For this reason it is preferred to treat the pure still residue to convert the ash content prior to recovery of the resin. That is, the pure still residue is mixed with a sufficient amount of organic acidic material to neutralize the alkaline ash content, the mixture is heated to complete the reaction, and the oil is then removed by distillation to leave the resin as a residue. The melting point of the resin is dependent upon and controllable by the extent to which the oil has been stripped out. The resin thus obtained contains the ash converted, in accordance with the invention, to a form that is less obnoxious than in untreated resin.

For instance, in this embodiment the pure still residue and an organic acid material such as wood rosin are charged into a still and heated to, for instance, 260° C., to initiate reaction. Thereafter steam is passed through the mix to drive out the high boiling oils to the desired extent. The bulk of the distillation will occur at a temperature of about 260 to 285° C., and distillation is continued until samples show the residue in the still to be satisfactory. Resins having melting points from 10 to 130° C. are easily obtained in this manner.

Using wood rosin we have found that with Clairton still residues of average composition satisfactory results are had with about 88 parts of pure still residues and 12 parts of wood rosin. The oil obtained in this embodiment of the invention is apparently similar in its properties to that obtained when the pure still residues are distilled prior to applying the invention to the resin except that when wood rosin is used the oil has a piney odor.

In one test of this aspect of the invention a mixture of 60 parts of pure still residue and 40 parts of acid solution resulting from acid washing of the light oils from which the pure still residues were derived was heated in a still and steam distilled to a still temperature of 280° C., removing the volatile oils. The residual product was a hard, brittle resin which differed from that obtained by simple distillation of the same residues in that it had a brighter, more typically resinous fracture. It possessed also improved solubility in aromatic solvents, as was shown by making 25 per cent solutions in xylol of the treated resin and untreated resin produced from the same residues by distillation without the use of acid sludge. The two solutions were allowed to stand over night, and at least twice as much sediment settled from the solution of untreated resin as from the treated resin.

According to the provisions of the patent statutes, we have explained the principle and manner of practicing our invention, and have described what we now consider to be its best embodiment. However, we desire to have it understood that, within the scope of the appended claims, the invention may be practiced otherwise than as specifically described.

We claim:

1. That method of improving resins resultant from pure still residues derived from fractionation of light oils produced in by-product coking of coal which comprises neutralizing the alkaline ash content of the resin material with rosin at an elevated temperature, and recovering resin containing the reacted ash.

2. That method of producing resins of improved character from pure still residues derived from fractionation of light oil produced in by-product coking of coal which comprises neutralizing the alkaline ash content of the pure still residues at an elevated temperature with rosin and steam distilling the mixture to remove oil therefrom and produce resin of desired melting point containing the reacted ash content of said residues.

3. As a new article of manufacture, a resin produced by distillation of oil from pure still residues resultant from fractionation of light oil produced in by-product coking of coal, the resin having at least a portion of its ash content in the form of a resinate, being bright, glossy and brown in color, and having a brilliant conchoidal fracture.

JOSEPH RIVKIN.
LYLE M. GEIGER.